US011411519B2

(12) United States Patent
Dyrlund et al.

(10) Patent No.: US 11,411,519 B2
(45) Date of Patent: Aug. 9, 2022

(54) METHOD FOR HANDLING SUB-SYNCHRONOUS RESONANCES

(71) Applicant: VESTAS WIND SYSTEMS A/S, Aarhus N (DK)

(72) Inventors: Poul Møhl Dyrlund, Lystrup (DK); Gert Karmisholt Andersen, Hovedgård (DK); Torsten Lund, Fredericia (DK); Hamid Soltani, Aarhus C (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 141 days.

(21) Appl. No.: 16/590,475

(22) Filed: Oct. 2, 2019

(65) Prior Publication Data

US 2020/0112276 A1 Apr. 9, 2020

(30) Foreign Application Priority Data

Oct. 5, 2018 (DK) .............................. PA201870661

(51) Int. Cl.
*G05B 19/048* (2006.01)
*H02P 9/00* (2006.01)
(Continued)

(52) U.S. Cl.
CPC .............. *H02P 9/007* (2013.01); *G05B 15/02* (2013.01); *G05B 19/048* (2013.01); *H02P 9/006* (2013.01); *H02P 2101/15* (2015.01)

(58) Field of Classification Search
None
See application file for complete search history.

(56) References Cited

U.S. PATENT DOCUMENTS

2010/0102558 A1\* 4/2010 Weichbold .............. F03D 15/10
290/44
2012/0217747 A1\* 8/2012 Cao ......................... H02J 3/386
290/44

(Continued)

FOREIGN PATENT DOCUMENTS

CN 106089422 A 11/2016
CN 107947202 A 4/2018
(Continued)

OTHER PUBLICATIONS

European Search Report for Application EP19200958 dated Jan. 7, 2020.

(Continued)

*Primary Examiner* — Jason Lin
(74) *Attorney, Agent, or Firm* — Patterson + Sheridan, LLP

(57) ABSTRACT

The present invention relates to a method of controlling a doubly fed induction generator wind turbine converter system in case of a sub-synchronous resonance event, the method comprising the steps of detecting the sub-synchronous resonance event, and switching from a first control mode to a second control mode in response to detecting the predetermined event, wherein the second control mode comprises the step of setting at least one rotor current controller parameter on the basis of a generator speed of the doubly fed induction generator. The predetermined event may also be a fault ride through event. The present invention further relates to a doubly fed induction generator wind turbine converter system being capable of handling such events.

15 Claims, 10 Drawing Sheets

(51) Int. Cl.
*G05B 15/02* (2006.01)
*H02P 101/15* (2016.01)

(56) References Cited

U.S. PATENT DOCUMENTS

| | | | | |
|---|---|---|---|---|
| 2012/0299305 | A1* | 11/2012 | Brogan | H02J 3/381 |
| | | | | 290/55 |
| 2013/0027994 | A1* | 1/2013 | Nelson | H02P 9/105 |
| | | | | 363/40 |
| 2013/0200621 | A1* | 8/2013 | Andresen | F03D 7/0284 |
| | | | | 290/44 |
| 2014/0138949 | A1 | 5/2014 | El Moursi et al. | |
| 2015/0249413 | A1 | 9/2015 | Ren et al. | |
| 2015/0330841 | A1* | 11/2015 | Kern | H05K 7/20209 |
| | | | | 702/136 |
| 2016/0208781 | A1 | 7/2016 | Kj R et al. | |
| 2017/0272014 | A1* | 9/2017 | Ren | F03D 9/255 |
| 2017/0353036 | A1* | 12/2017 | Gil Lizarbe | H02J 3/381 |
| 2018/0102720 | A1* | 4/2018 | Barker | G05F 1/70 |

FOREIGN PATENT DOCUMENTS

| | | |
|---|---|---|
| CN | 106059422 B | 9/2018 |
| EP | 3166197 A1 | 5/2017 |
| EP | 3314741 A1 | 5/2018 |
| EP | 3460943 A1 | 3/2019 |
| WO | 2017000945 A1 | 1/2017 |

OTHER PUBLICATIONS

Danish Patent and Trademark Office 1st Technical Examination for Application No. PA 2018 70661 dated Apr. 4, 2019.

* cited by examiner

METHOD FOR HANDLING SUB-SYNCHRONOUS RESONANCES

FIELD OF THE INVENTION

The present invention relates to a method for handling sub-synchronous resonances for doubly fed induction generators connected through series compensated transmission lines.

BACKGROUND OF THE INVENTION

The global penetration of wind power in sparsely populated areas with weak grids has increased over the recent years. A cost efficient way of increasing the transfer capacity of long power lines is to use series capacitor compensation which reduces the equivalent reactance at the fundamental frequency. However, problems associated with Sub-Synchronous Resonances (SSR) for Doubly Fed Induction Generators (DFIGs) connected through series compensated lines have been observed at a variety of locations.

SSRs in DFIGs connected to series compensated networks generally occurs because of the combination of two conditions. The first condition is that when the grid reactance is partly compensated with a series capacitor, a frequency below the sub-synchronous frequency where the total reactance in the system is zero, will exist. This frequency is close to the natural resonance point of the system. The second condition is that the negative slip at sub-synchronous frequencies causes the equivalent rotor resistance of the induction generator to be negative at this frequency. Depending on the control of the rotor-side converter, this can give a total negative impedance of the induction generator.

Prior art methods for handling SSRs are discussed in Applicant's European patent applications EP 3 314 710 A1 and EP 3 314 741 A1 which as hereby incorporated by reference.

It may be seen as an object of embodiments of the present invention to provide an improved method for handling SSRs in a DFIG configuration.

It may be seen as a further object of embodiments of the present invention to provide a method for handling SSRs in a DFIG configuration which takes into account the dependency of the rotor impedance on parameters like for example rotor current controller parameter, active and reactive power.

DESCRIPTION OF THE INVENTION

The above-mentioned objects are complied with by providing, in a first aspect, a method of controlling a doubly fed induction generator wind turbine converter system in case of a sub-synchronous resonance event, the method comprising the steps of
  detecting the sub-synchronous resonance event,
  switching from a first control mode to a second control mode in response to detecting the predetermined event, wherein the second control mode comprises the step of setting of at least one rotor current controller parameter on the basis of the generator speed of the doubly fed induction generator.

Thus, the present invention relates to a method that, in a second control mode, takes the generator speed into account when controlling a doubly fed induction generator.

The predetermined event may be a SSR event and/or a fault ride through (FRT) event, such as a low voltage ride through (LVRT) event or an over voltage ride through (OVRT) event. LVRT and OVRT events have been discussed thoroughly in the patent literature as well as in scientific papers.

In case the predetermined event involves SSRs the first control mode may be considered a none sub-synchronous control mode which is not configured to handle sub-synchronous resonances, whereas the second control mode may be considered a sub-synchronous control mode in that it is configured to handle sub-synchronous resonances by taking onto account the generator speed when setting at least one controller parameter.

The term controller parameter is to be understood broadly and it may thus relate to any controller parameter, including proportional controller gains ($K_P$), integral controller gains ($K_I$) and/or derivative controller gains ($K_D$) or even more advanced controller parameters. A stable set of system controller parameters may be selected by taking into account the Nyquist criterion.

A DFIG configuration may comprise one or more controllers, such as a rotor current controller and/or a power controller. The step of setting at least one controller parameter may thus comprise a setting of at least one rotor current controller parameter on the basis of the generator speed of the doubly fed induction generator. As addressed above rotor current controller parameters may comprise $K_P$, $K_I$ and/or $K_D$ or even more advanced controller parameters.

Similarly, the step of setting at least one controller parameter may comprise a setting of at least one power controller parameter on the basis of the generator speed of the doubly fed induction generator. Power controller parameters may comprise $K_P$, $K_I$ and/or $K_D$ or even more advanced controller parameters.

According to the present invention the step of setting at least one power controller parameter may depend on the setting of at least one rotor current controller parameter. Thus, at least one power controller parameter may depend on at least one rotor current controller parameter which again depends on generator speed of the doubly fed induction generator.

The step of setting at least one controller parameter may furthermore be based on a selected sub-synchronous resonance mitigation level. The selected sub-synchronous resonance mitigation level may be selected among a plurality of sub-synchronous resonance mitigation levels, such as for example two mitigation levels (fast and slow mitigation). It should be noted that the number of mitigation levels may deviate from the two levels mentioned here Moreover, the step of setting at least one controller parameter may be based on a stator connection of the doubly fed induction generator, such as a star-connection or a delta-connection.

The step of setting at least one controller parameter on the basis of a generator speed may involve use of a mathematical formula and/or a look-up table that expresses a dependency between at least one controller parameter and the generator speed. The mathematical formula and/or look-up table may for example express a linear, a nonlinear, a step-wise or a different dependency. In a particular embodiment the mathematical formula and/or the look-up table may express a dependency between a controller bandwidth and the generator speed. Also this dependency may be a linear, a nonlinear, a step-wise etc. dependency.

In a second aspect the present invention relates to a doubly fed induction generator wind turbine converter system adapted to handle a sub-synchronous resonance event, the converter system comprising an arrangement for detecting the sub-synchronous resonance event, an arrangement for switching the converter system from a first control mode to a second control mode in response to detecting the predetermined event, wherein, in the second control mode, at least one controller parameter is set on the basis of the generator speed of the doubly fed induction generator.

Again, the predetermined event may be a SSR event and further a FRT event, such as a LVRT event or an OVRT event. Thus, the detecting arrangement should be adapted to detect an SSR event and/or a FRT event.

Similar to the first aspect, the term rotor current controller parameter is to be understood broadly and it may thus relate to any rotor current controller parameter, including proportional controller gains ($K_P$), integral controller gains ($K_I$) and/or derivative controller gains ($K_D$) or even more advanced controller parameters. In order to establish a stable system controller parameters may be selected by taking into account the Nyquist criterion.

The DFIG converter system may comprise one or more controllers, such as a rotor current controller and/or a power controller. At least one rotor current controller parameter may be set on the basis of the generator speed of the doubly fed induction generator. As addressed above rotor current controller parameters may comprise $K_P$, $K_I$ and/or $K_D$ or even more advanced controller parameters.

Similarly, at least one power controller parameter may be set on the basis of the generator speed of the doubly fed induction generator. Power controller parameters may also comprise $K_P$, $K_I$ and/or $K_D$ or even more advanced controller parameters.

According to the present invention at least one power controller parameter may depend on the setting of at least one rotor current controller parameter. Thus, at least one power controller parameter may depend on at least one rotor current controller parameter which again depends on generator speed of the doubly fed induction generator.

At least one controller parameter may furthermore be based on a selected sub-synchronous resonance mitigation level. The selected sub-synchronous resonance mitigation level may be selected among a plurality of sub-synchronous resonance mitigation levels, such as for example a fast and a slow mitigation level. It should be noted that the number of mitigation levels may deviate from the two levels mentioned here. Moreover, at least one controller parameter may be based on a stator connection of the doubly fed induction generator, such as a star-connection or a delta-connection.

At least one controller parameter may be set using of a mathematical formula and/or a look-up table that expresses a dependency between at least one controller parameter and the generator speed. The mathematical formula and/or look-up table may for example express a linear, a nonlinear, a step-wise or a different dependency. In a particular embodiment the mathematical formula and/or the look-up table may express a dependency between a controller bandwidth and the generator speed. This dependency may be linear, nonlinear, step-wise etc.

In a third aspect the present invention relates to a computer program product for carrying out the method according to the first aspect when said computer program product is run on a microprocessor forming part of a controller of a doubly fed induction generator wind turbine converter system.

In a fourth aspect the present invention relates to a doubly fed induction generator wind turbine comprising a doubly fed induction generator wind turbine converter system according to the second aspect.

BRIEF DESCRIPTION OF THE DRAWINGS

The present invention will now be described in further details with reference to the accompanying figures, wherein FIG. 1 schematically illustrates a wind turbine with a power-generating system shown in more detail in FIG. 2.

Figure 1:
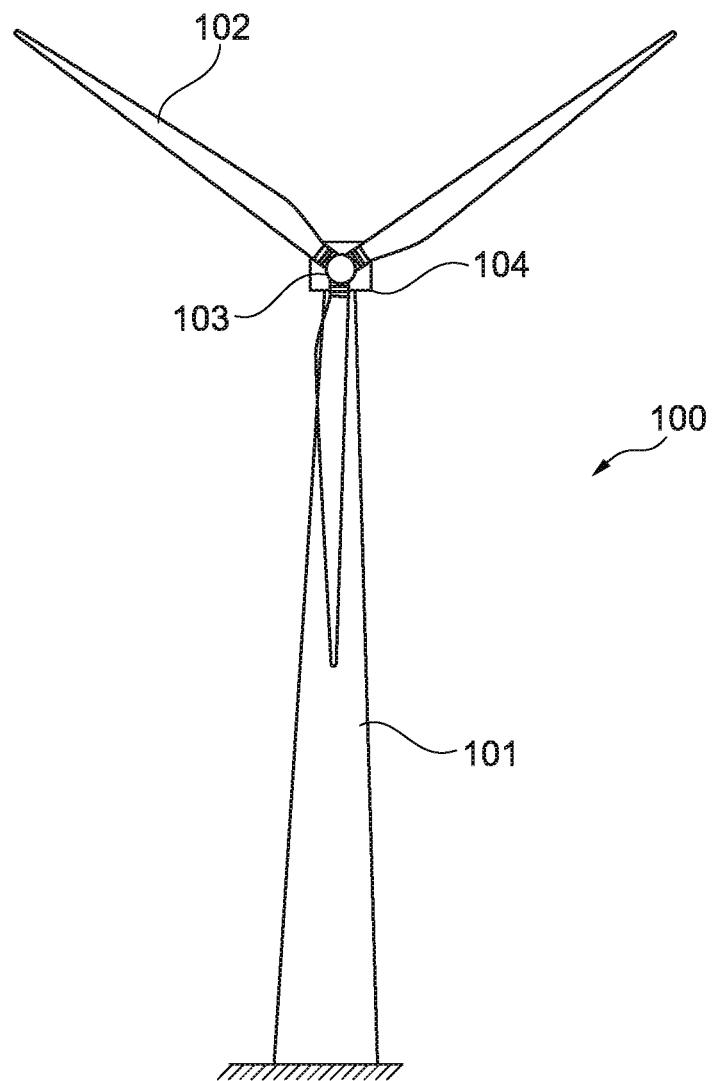

While the invention is susceptible to various modifications and alternative forms, specific embodiments have been shown by way of examples in the drawings and will be described in details herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

In a general aspect the present invention relates to a method for handling SSR events in doubly fed induction generators connected through series compensated transmission lines. The method of the present invention applies information about the generator speed when setting at least one controller parameter, such as proportional controller gains ($K_P$), integral controller gains ($K_I$) and/or derivative controller gains ($K_D$) or even more advanced controller parameters in rotor current controllers and/or power controllers. The method of the present invention is also applicable during FRT events.

As shown in FIG. 1 a wind turbine 100 comprises a wind turbine tower 101 and a nacelle 104 mounted thereon. Moreover, the wind turbine 100 comprises a set of rotor blades 102 secured to a hub 103. The rotor blades 102 drive a shaft which drives a DFIG (not shown).

Figure 2:
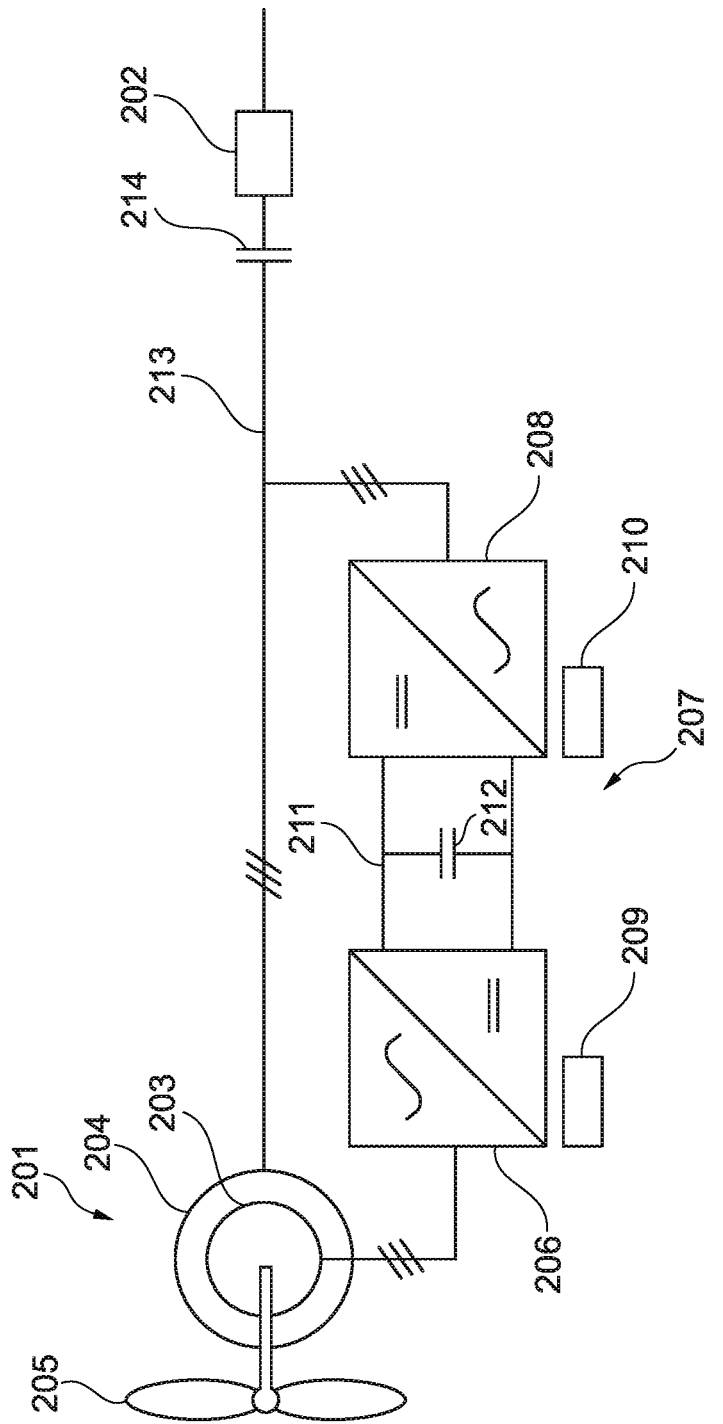
FIG. 2 is a schematic circuit diagram of a DFIG wind turbine's power generating system connected to a series-compensated power transmission line, FIG. 3 schematically illustrates a wind power plant connected to a series-compensated power transmission line.

Referring now to FIG. 2 a wind turbine generator 201 coupled to an electricity grid 202 is schematically illustrated. A generator-rotor 203 of the wind turbine generator 201 is driven by the rotor blades 205. The generator-rotor 203 is coupled to a power converter 207 which comprises a rotor-side inverter 206 and a grid-side inverter 208. The wind turbine generator 201 and the power converter 207 form the power-generating system of the wind turbine 100, shown in FIG. 1.

The rotor-side inverter 206 of the power converter 207 sets rotor-voltages and rotor-currents and thereby induces a magnetic flux in the generator-rotor 203 which may rotate faster or slower than rotor blades 205 depending on the current wind speed and the current desired power production of the wind turbine 100.

The rotor-side inverter 206 is connected to a grid-side inverter 208 via a DC link 211, comprising a capacitor 212 as an energy storage element. The grid-side inverter 208, however, receives branched off three-phase currents that are used to feed the generator-rotor 203 via the power converter 207. The rotor-side inverter 206 is controlled by the rotor-side inverter controller 209, whereas the grid-side inverter 208 is controlled by a grid-side converter controller 210.

The generator-stator 204 is connected directly to the power grid 202 via a series-compensated power transmission line 213. The series-compensation is given by a capacitor 214 connected in series to the power transmission line 213. The generator-rotor 203 induces fixed-frequency AC currents, e.g. 50 Hz, in the generator-stator 204 in order to produce fixed-frequency power to the power grid 202. The currents in the generator-rotor 203 are set by the power converter 207 such that the fixed-frequency current in the stator is reached. The power output of the wind turbine is measured by a power/current-output measurement device (not shown).

Figure 3:
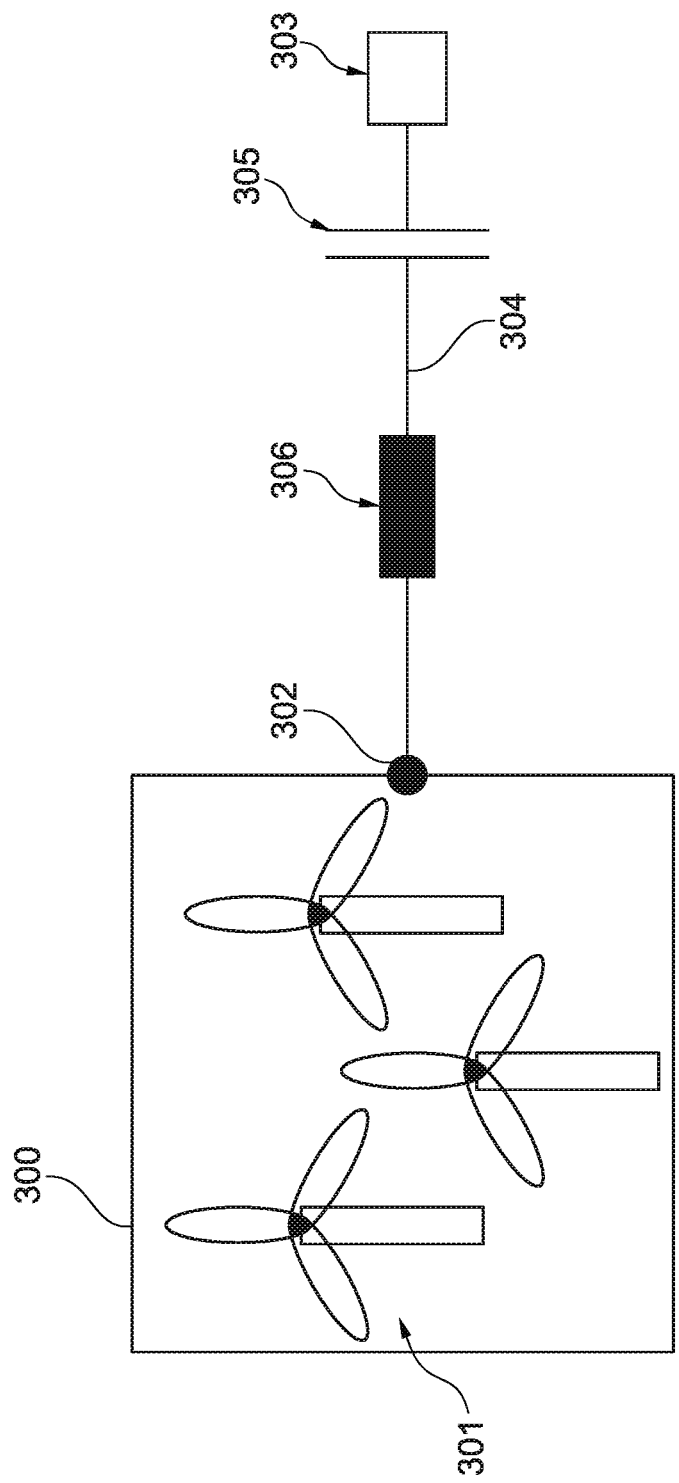

Referring now to FIG. 3 a wind power plant 300 comprising a plurality of wind turbines 301 and a point of common coupling 302 (PCC) to an electricity grid 303 is depicted. The wind turbines 301 of the wind power plant 300 are each connected to the point of common coupling 302, at which the wind power plant 300 is connected to the electricity grid 303.

The wind power plant 300 provides power to the electricity grid 303 via a series-compensated power transmission line 304. The series compensation is achieved by connecting a capacitor 305 in series to the power transmission line 304. The inductance of the power transmission line 304 is schematically illustrated by the black box 306.

An SSR event occurring due to the series compensation of power line 304, caused by the insertion of the capacitor 305, may spread through the PCC 302 to the wind power plant 300, and thereby affect several wind turbines 301. In fact an SSR event may cause massive damage to the wind turbines 301 of the wind power plant 300.

Figure 4:
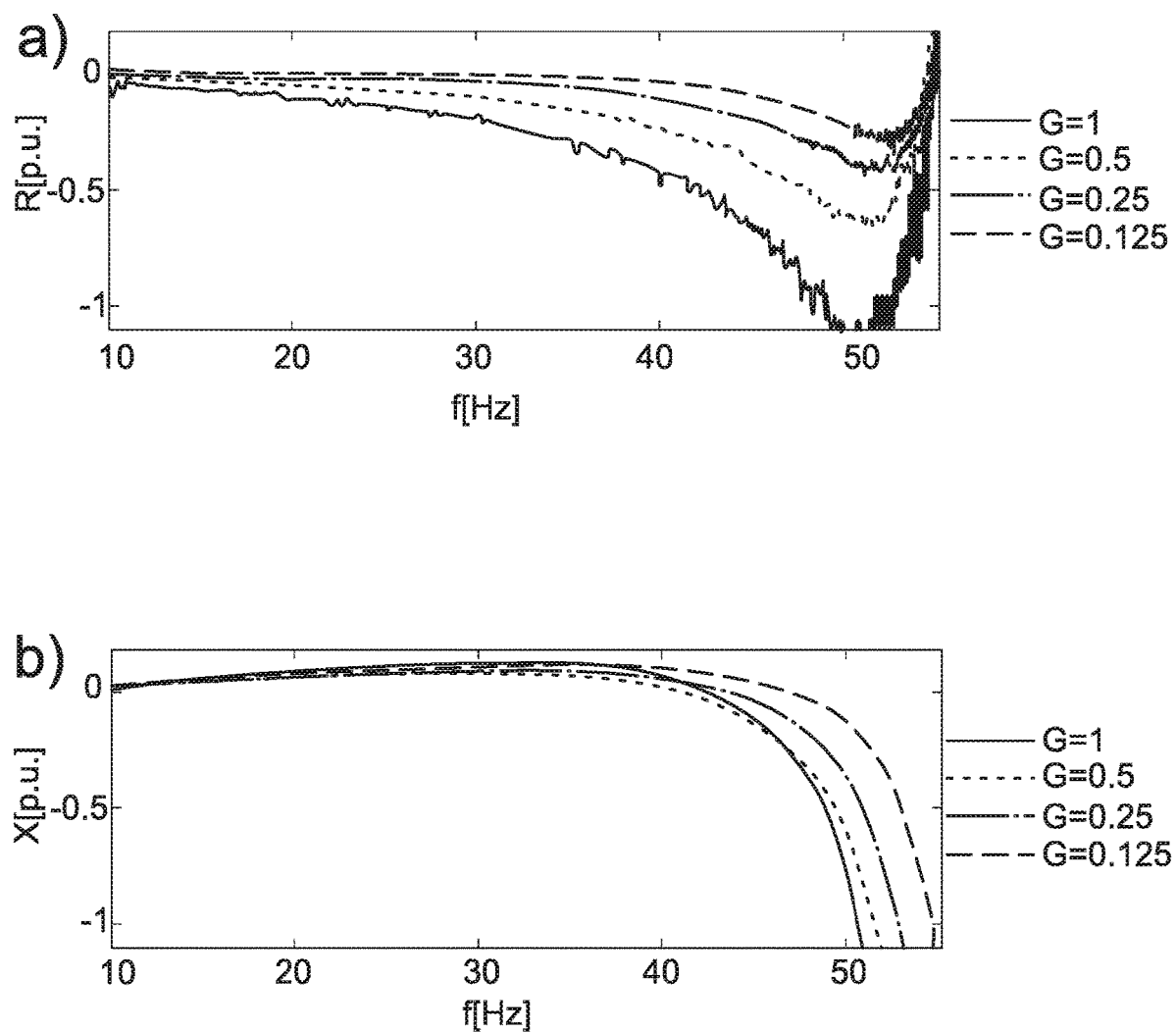
FIG. 4 shows the dependency of the impedance on the controller bandwidth for P=0.5 p.u. and Q=0 p.u.

As it will be demonstrated in FIG. 4 the impedance depends on the bandwidth of the rotor current controller, i.e. the controller parameters of the rotor current controller. In addition, the bandwidth of the rotor current controller and the power controller depends on the generator speed, cf. FIG. 8 and the associated disclosure.

FIG. 4 shows measured impedance spectra with variable rotor current controller bandwidth with FIG. 4*a* showing the resistance and FIG. 4*b* showing the reactance. In FIG. 4 G=1 corresponds to a typical bandwidth of the rotor current controller for operation in a strong network. When the bandwidth of the rotor current controller is reduced, the negative resistance in FIG. 4*a* is significantly reduced. This is advantageous for the overall stability of the system. For frequencies lower than 35 Hz, which is usually where SSRs are observed, the reactance is hardly affected by the change in rotor current controller bandwidth. These findings are consistent with publications on the subject.

Figure 5:
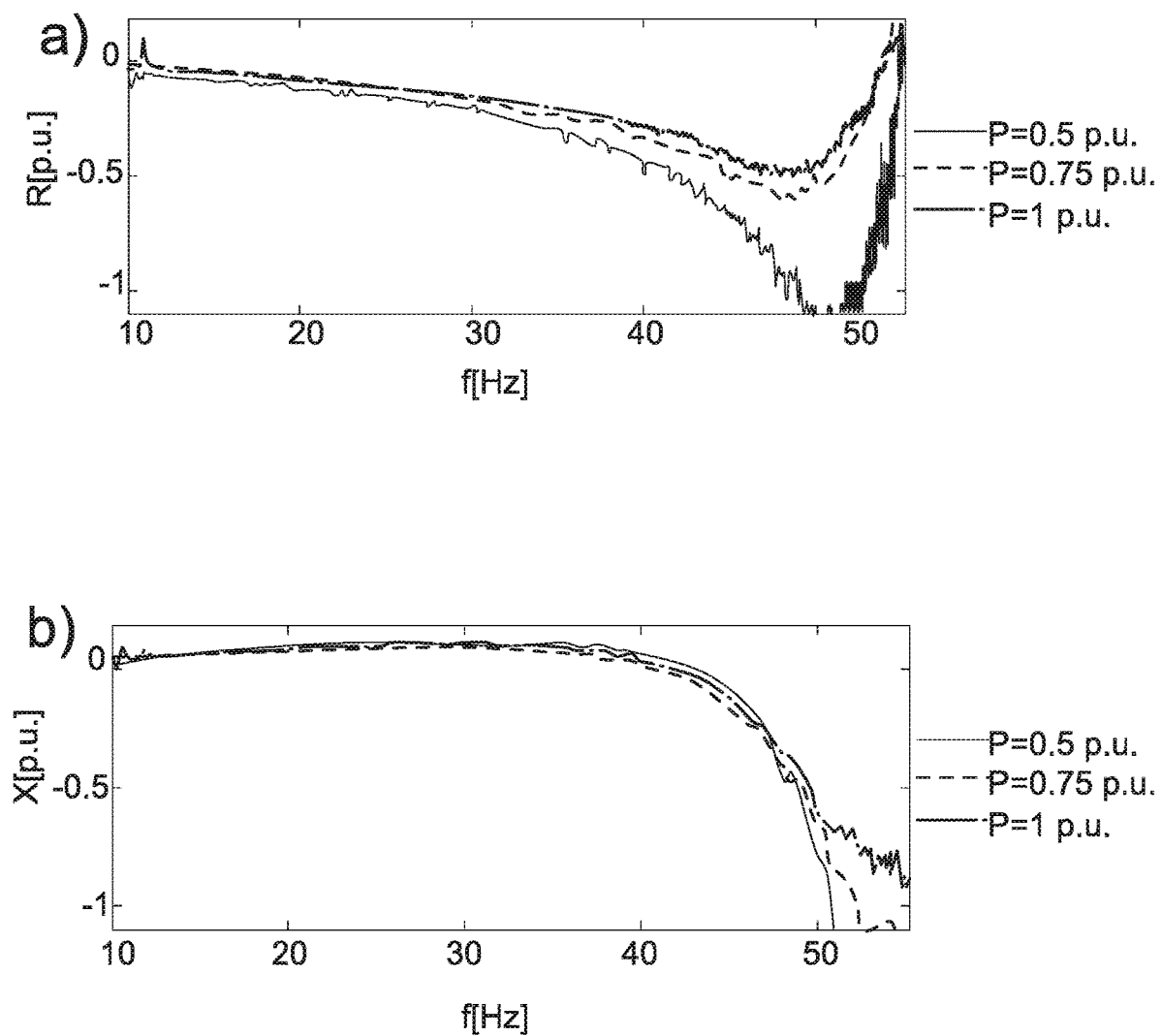
FIG. 5 shows the dependency of the impedance on active power production for G=1 and Q=0 p.u.

The influence of active power production on the impedance is illustrated in FIG. 5, where FIG. 5*a* shows the resistance, and FIG. 5*b* shows the reactance. Where the reactance is relatively unaffected, cf. FIG. 5*b*, by the power production level for frequencies below 50 Hz, the power production has a large impact on the resistance, cf. FIG. 5*a*.

As seen in FIG. 5*a* the resistance becomes more negative when the power production is reduced. It should be noted that the generator followed the maximum power point tracking curve during the tests. At reduced power productions, e.g. at P=0.5 p.u., the generator was operated at lower generator speeds which leads to a reduced bandwidth, cf. FIG. 8. Therefore, the influence from power production, and thereby the resistance, cannot be separated from the influence from the generator speed.

Figure 6:
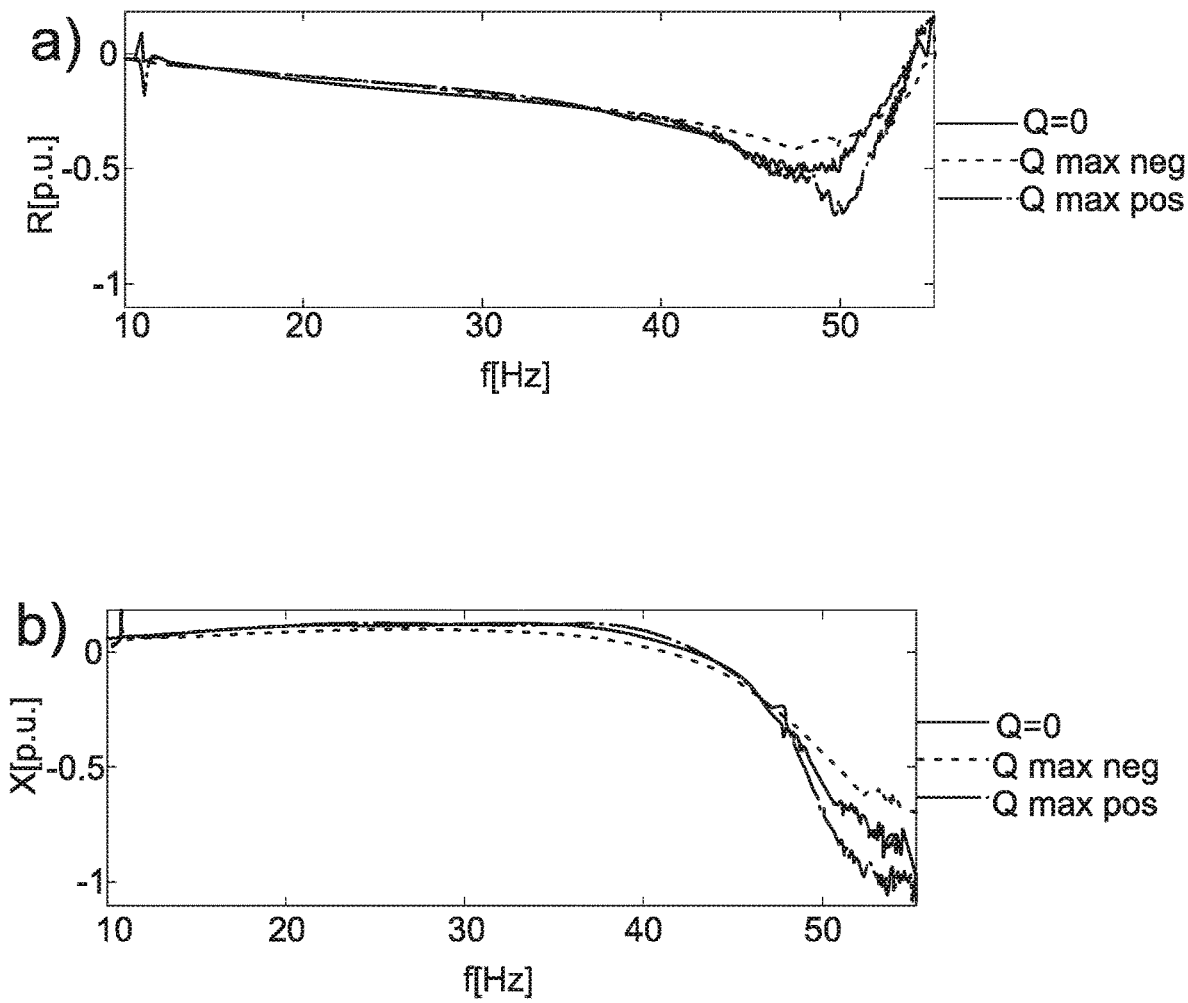
FIG. 6 shows the dependency of the impedance on reactive power production for G=1 and P=1 p.u.

Finally, the effect of the reactive power injection on the impedance is investigated. The reactive power is varied between the maximum absorption according to the PQ chart to the maximum injection. As seen in FIG. 6, the reactive power only has a limited effect on the impedance. The tendency is that absorption will reduce the magnitude of the resistance and reactance, cf. FIGS. 6*a* and 6*b*.

To avoid reaching a voltage limit of the rotor current converter at high slips, it is possible to switch the connection of the stator windings from a delta to a star coupling. By doing so, the impedance of the generator seen from the grid gets multiplied by three, which has a large impact on the SSR behaviour.

Figure 7:
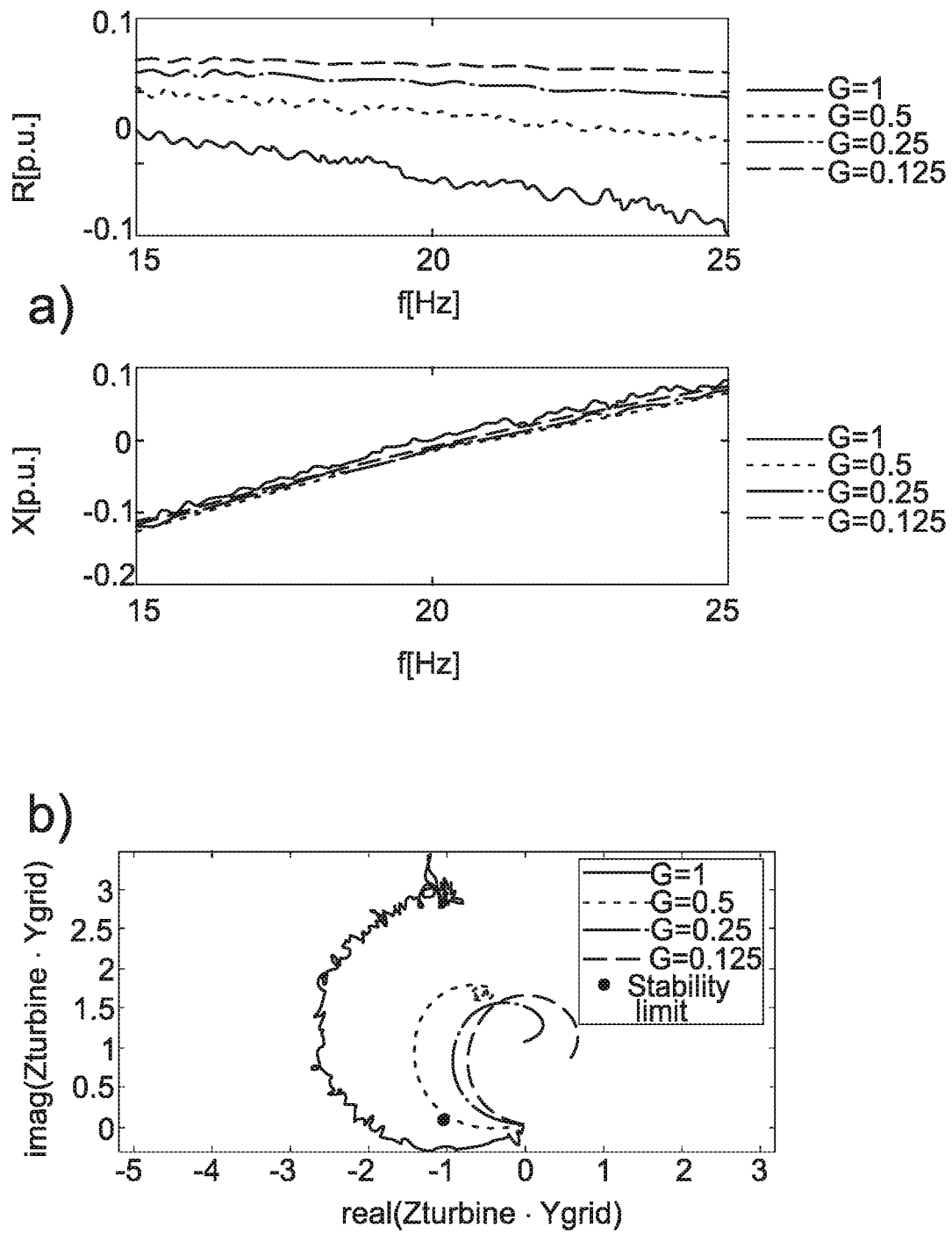
FIG. 7 shows in a) the sum of turbine impedance and grid impedance at P=0.5 p.u., Q=0 p.u., SCR=3, compensation degree=0.2, and X/R=5, and in b) the corresponding Nyquist stability criterion.

The stability may be evaluated by looking at the sum of the generator impedance and the network impedance, cf. FIG. 7*a*. At the default gain, i.e. G=1 p.u., the total reactance crosses zero at approximately 19.5 Hz. At that point, the total resistance is negative which would lead to an unstable system. However, if the gain is reduced to G=0.5 p.u., the resistance becomes positive at the frequency where the reactance crosses zero; i.e. the system is stable. Regarding stability FIG. 7*b* shows, how the more accurate Nyquist criterion can be used for the assessment of stability. In FIG. 7*b* the product of the generator impedance and the network admittance shall not encircle the point (−1,0) as this would lead to an unstable system. As seen in FIG. 7*b* the point (−1,0) is encircled when G=1 p.u., i.e. the system is unstable. However, if the gain is reduced by a factor of 2, i.e. to G=0.5 p.u. the point (−1,0) is no longer encircled and the system now becomes stable.

Figure 8:
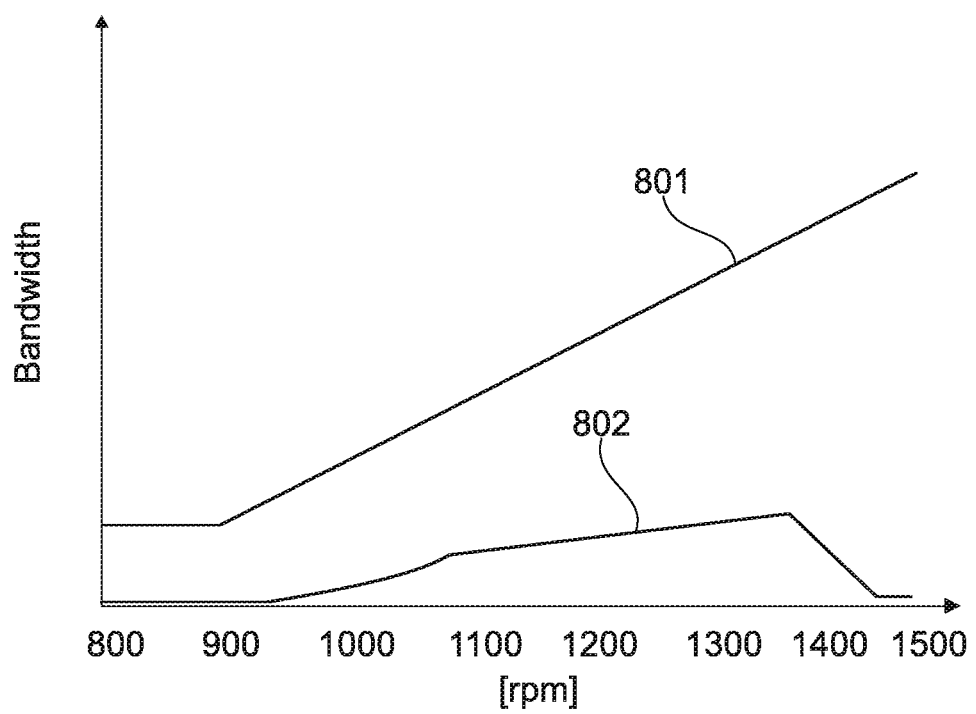
FIG. 8 shows and example of the rotor current controller bandwidth and the power controller bandwidth as a function of generator speed, FIG. 9 schematically illustrates the method of the present invention in the form of a block diagram, and FIG. 10 schematically illustrates how to handle a grid fault using the method of the present invention.

FIG. 8 shows how the bandwidths 801, 802 of the rotor current controller and power controller depend of the generator speed, respectively. In FIG. 8 the synchronous speed is 1200 rpm and stator connection is a delta connection. As seen in FIG. 8 the bandwidth of the rotor current controller increases linearly with the generator speed, cf. line 801, whereas the bandwidth of the power converter increases in a none-linear manner with the generator speed, cf. line 802.

Figure 9:
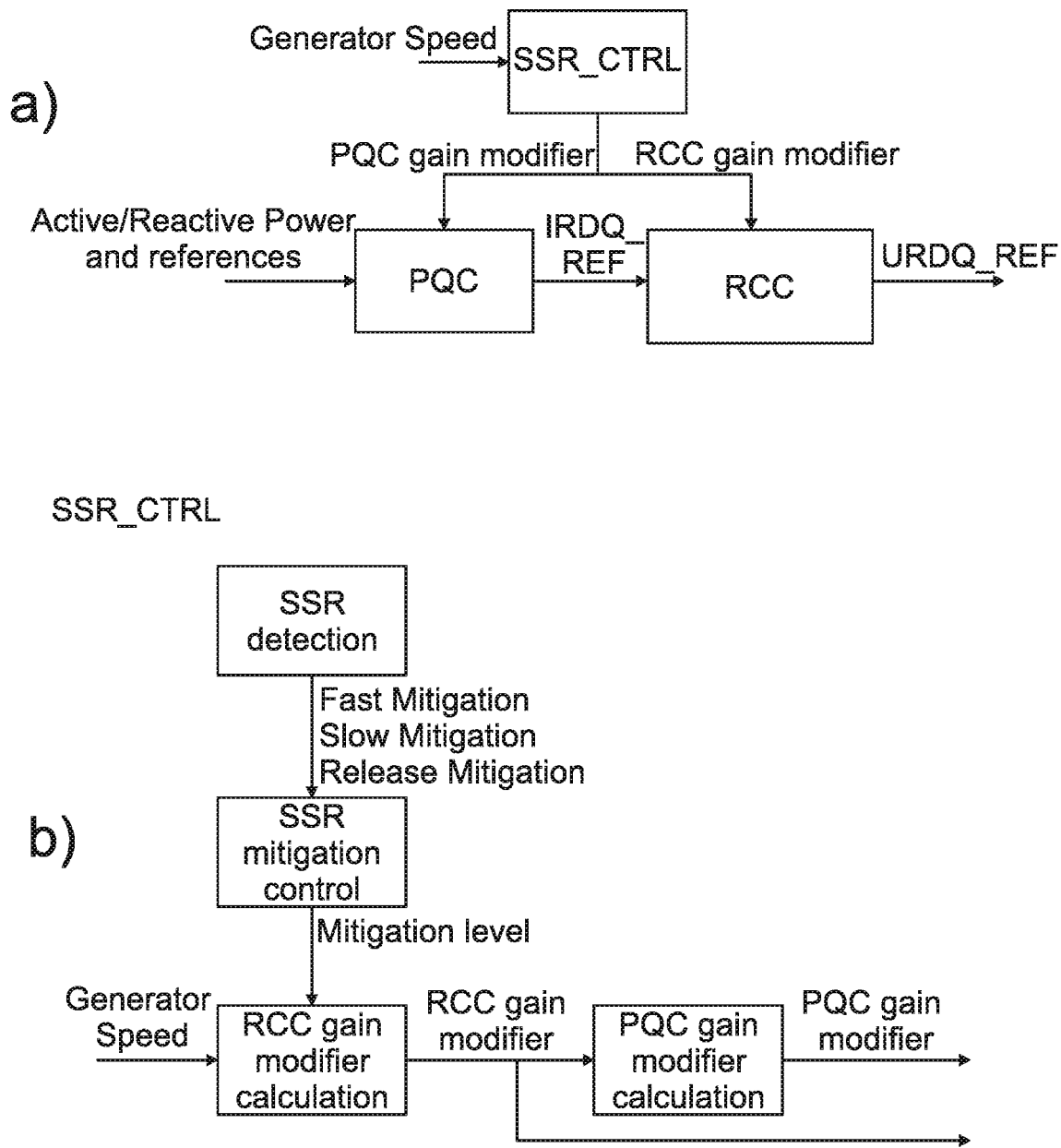

FIG. 9 illustrates the method of the present invention. As seen in FIG. 9*a* the SSR controller (SSR_CTRL) receives information about the generator speed. This information is used to generate respective control signals to the power controller (PQC) and the rotor current controller (RCC) with PQC gain modifier being the control signal for the PQC, and RCC gain modifier being the control signal for RCC. The respective control signals may relate to the proportional controller gains ($K_P$), the integral controller gains ($K_I$) and/or the derivative controller gains ($K_D$) of the PQC and the RCC.

In addition to the PQC gain modifier control signal from the SSR_CTRL reference signals relating to active and reactive power levels are provided to the PQC which in responds thereto generates the reference signal IRDQ_REF=IRD_REF+jIRQ_REF to the RCC where IRD and IRQ represent direct and quadrature rotor currents in a reference frame which can be synchronized with e.g. stator voltage, stator flux or rotor flux of the generator. Based on the RCC gain modifier and the IRDQ_REF the reference signal URDQ_REF is generated.

Referring now to FIG. 9b the signal processing within the SSR_CTRL is depicted. Initially it is detected that an SSR event has actually occurred. In view of this detection a mitigation level is selected among a plurality mitigation levels. The number of selectable mitigation levels may in principle be arbitrary. In the embodiment shown in FIG. 9b the mitigation level may be selected among two predefined mitigation levels—a fast and a slow mitigation level. An RCC gain modifier calculation step applies the selected mitigation level and information about the generator speed to calculate the RCC gain modifier control signal which is used to calculate the PQC gain modifier control signal. As addressed in connection with FIG. 9a the RCC gain modifier control signal is applied to the RCC, whereas the PQC gain modifier control signal is applied to the PQC.

Figure 10:
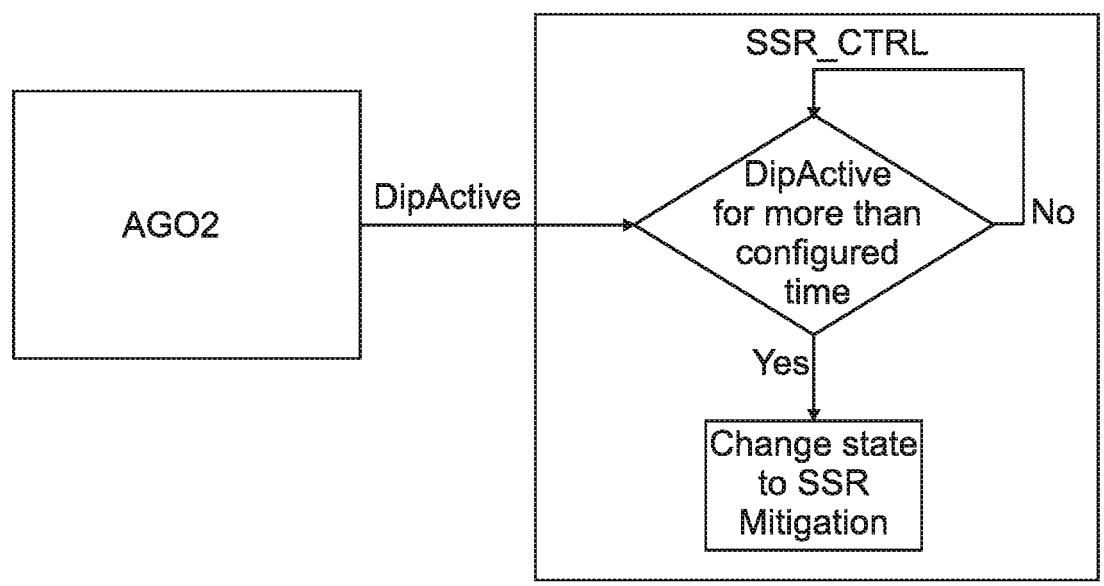

In grid configurations with series compensated transmission lines a FRT event, such as a LVRT or OVRT, may result in SSRs as the FRT may cause openings of a number of parallel transmission lines. The method of the present invention is therefore also applicable in relation to FRT events in that SSR mitigation as disclosed above may be activated a certain (configurable) time period after the FRT event has been detected. FRT triggered SSR mitigation is depicted in FIG. 10 where an advanced grid operation unit (AGO2) detects a grid voltage dip represented by the control signal DipActive. If the duration of the grid voltage dip exceeds a certain (configurable) time period SSR mitigation is activated.

What is claimed is:

1. A method of controlling a converter system of a doubly fed induction generator (DFIG) wind turbine, the method comprising:
   detecting a sub-synchronous resonance (SSR) event while the converter system operates in a first control mode; and
   switching operation of the converter system to a second control mode in response to detecting the SSR event, wherein operating the converter system in the second control mode comprises:
      receiving a generator speed of the DFIG wind turbine;
      generating, based on the generator speed, a first control signal to modify a first gain of a power controller of the DFIG wind turbine; and
      generating, based on the generator speed, a second control signal to modify a second gain of a rotor current controller of the DFIG wind turbine,
   wherein the rotor current controller receives a reference signal from the power controller to which the first gain has been applied, wherein the converter system is controlled based on at least one of the modified first gain or the modified second gain.

2. The method according to claim 1, wherein the SSR event comprises a fault ride through event.

3. The method according to claim 1, wherein generating the second control signal for the power controller depends on the second control signal for the rotor current controller.

4. The method according to claim 1, wherein operating the converter system in the second control mode further comprises:
   selecting a mitigation level from a plurality of predefined mitigation levels; and
   determining the second gain of the rotor current controller based on the selected mitigation level.

5. The method according to claim 1, wherein operating the converter system in the second control mode further comprises:
   determining the second gain of the rotor current controller based on a stator connection of the DFIG wind turbine.

6. The method according to claim 1, wherein operating the converter system in the second control mode further comprises:
   determining the second gain of the rotor current controller using at least one of a mathematical formula and a look-up table that expresses a dependency between the second gain and the generator speed.

7. The method according to claim 6, wherein one or both of the mathematical formula and the look-up table expresses a dependency between a controller bandwidth and the generator speed.

8. A converter system of a doubly fed induction generator (DFIG) wind turbine, the converter system comprising:
   a power controller comprising a first gain;
   a rotor current controller comprising a second gain, wherein the rotor current controller is configured to receive a reference signal from the power controller to which the first gain has been applied; and
   a sub-synchronous resonance (SSR) controller configured to:
      detect a SSR event while the converter system operates in a first control mode; and
      switch operation of the converter system to a second control mode in response to detecting the SSR event, wherein operating the converter system in the second control mode comprises:
         receive a generator speed of the DFIG wind turbine;
         generate, based on the generator speed, a first control signal to modify the first gain; and
         generate, based on the generator speed, a second control signal to modify the second gain, wherein the converter system is controlled based on at least one of the modified first gain or the modified second gain.

9. The converter system according to claim 8, wherein the SSR event comprises a fault ride through event.

10. The converter system according to claim 8, wherein operating the converter system in the second control mode further comprises:
    determining the second gain of the rotor current controller using at least one of a mathematical formula and a look-up table that expresses a dependency between the second gain and the generator speed.

11. A computer program product comprising a non-transitory computer-readable medium storing instructions which, when executed by one or more computer processors forming part of a controller of a converter system of a doubly fed induction generator (DFIG) wind turbine, perform an operation comprising:
    detecting a sub-synchronous resonance (SSR) event while the converter system operates in a first control mode; and
    switching operation of the converter system to a second control mode in response to detecting the SSR event, wherein operating the converter system in the second control mode comprises:
       receiving a generator speed of the DFIG wind turbine;

generating, based on the generator speed, a first control signal to modify a first gain of a power controller of the DFIG wind turbine; and generating, based on the generator speed, a second control signal to modify a second gain of a rotor current controller of the DFIG wind turbine, wherein the rotor current controller receives a reference signal from the power controller to which the first gain has been applied, wherein the converter system is controlled based on at least one of the modified first gain or the modified second gain.

12. The computer program product according to claim 11, wherein the SSR event comprises a fault ride through event.

13. The computer program product according to claim 11, wherein generating the second control signal for the power controller depends on the second control signal for the rotor current controller.

14. The computer program product according to claim 11, wherein operating the converter system in the second control mode further comprises:

selecting a mitigation level from a plurality of predefined mitigation levels; and determining the second gain of the rotor current controller based on the selected mitigation level.

15. The computer program product according to claim 11, wherein operating the converter system in the second control mode further comprises:

determining the second gain of the rotor current controller based on a stator connection of the DFIG wind turbine.

* * * * *